United States Patent
Breckenridge et al.

(10) Patent No.: US 8,250,009 B1
(45) Date of Patent: *Aug. 21, 2012

(54) UPDATEABLE PREDICTIVE ANALYTICAL MODELING

(75) Inventors: Jordan M. Breckenridge, Menlo Park, CA (US); Travis H. K. Green, New York, NY (US); Robert Kaplow, New York, NY (US); Wei-Hao Lin, New York, NY (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,564

(22) Filed: Sep. 26, 2011

Related U.S. Application Data

(63) Continuation of application No. 13/014,223, filed on Jan. 26, 2011.

(51) Int. Cl.
*G06F 15/18* (2006.01)

(52) U.S. Cl. ............... 706/14; 706/12; 706/15; 706/16; 706/17; 706/18; 706/19; 706/20; 706/21; 706/45; 706/46; 706/52; 706/62

(58) Field of Classification Search .................. None
See application file for complete search history.

(56) References Cited

U.S. PATENT DOCUMENTS

| | | | |
|---|---|---|---|
| 5,271,088 A | 12/1993 | Bahler | |
| 6,243,696 B1 * | 6/2001 | Keeler et al. | 706/21 |
| 6,778,959 B1 | 8/2004 | Wu et al. | |
| 6,879,971 B1 * | 4/2005 | Keeler et al. | 706/21 |
| 6,920,458 B1 | 7/2005 | Chu et al. | |
| 7,010,696 B1 | 3/2006 | Cambridge et al. | |
| 7,054,847 B2 * | 5/2006 | Hartman et al. | 706/12 |
| 7,194,395 B2 | 3/2007 | Genovese | |
| 7,349,919 B2 | 3/2008 | Russell et al. | |
| 7,565,304 B2 | 7/2009 | Casati et al. | |
| 7,590,589 B2 | 9/2009 | Hoffberg | |
| 7,606,924 B2 | 10/2009 | Raz et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |

(Continued)

OTHER PUBLICATIONS

PMML 4.0 General Structure of a PMML Document, [online] [Retrieved on May 1, 2011]. Retrieved from the Internet: <URL: dmg.org/v4-0-1/General Structure.html>, 9 pages.

(Continued)

*Primary Examiner* — Omar Fernandez Rivas
(74) *Attorney, Agent, or Firm* — Fish & Richardson P.C.

(57) ABSTRACT

Methods, systems, and apparatus, including computer programs encoded on one or more computer storage devices, for training and retraining predictive models. A series of training data sets for predictive modeling can be received, e.g., over a network from a client computing system. The training data included in the training data sets is different from initial training data that was used with multiple training functions to train multiple trained predictive models stored in a predictive model repository. The series of training data sets are used with multiple trained updateable predictive models obtained from the predictive model repository and multiple training functions to generate multiple retrained predictive models. An effectiveness score is generated for each of the retrained predictive models. A first trained predictive model is selected from among the trained predictive models included in the predictive model repository and the retrained predictive models based on their respective effectiveness scores.

25 Claims, 8 Drawing Sheets

U.S. PATENT DOCUMENTS

| | | | |
|---|---|---|---|
| 7,813,870 | B2 | 10/2010 | Downs et al. |
| 7,813,944 | B1 | 10/2010 | Luk et al. |
| 7,899,611 | B2 | 3/2011 | Downs et al. |
| 7,912,628 | B2 | 3/2011 | Chapman et al. |
| 7,930,266 | B2 | 4/2011 | Tuv et al. |
| 7,970,721 | B2 | 6/2011 | Leskovec et al. |
| 7,979,365 | B2 | 7/2011 | Goldberg et al. |
| 8,027,854 | B2 | 9/2011 | Baggett et al. |
| 8,065,073 | B2 | 11/2011 | Downs et al. |
| 8,065,659 | B1 | 11/2011 | Prince et al. |
| 8,090,524 | B2 | 1/2012 | Chapman et al. |
| 2002/0099730 | A1 | 7/2002 | Brown et al. |
| 2003/0212851 | A1 | 11/2003 | Drescher et al. |
| 2005/0234753 | A1 | 10/2005 | Pinto et al. |
| 2007/0005311 | A1 | 1/2007 | Wegerich et al. |
| 2007/0150424 | A1* | 6/2007 | Igelnik .............................. 706/15 |
| 2008/0097937 | A1 | 4/2008 | Hadjarian |
| 2008/0154821 | A1 | 6/2008 | Poulin |
| 2008/0270363 | A1 | 10/2008 | Hunt et al. |
| 2008/0288209 | A1 | 11/2008 | Hunt et al. |
| 2008/0288889 | A1 | 11/2008 | Hunt et al. |
| 2008/0294372 | A1 | 11/2008 | Hunt et al. |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0018996 | A1 | 1/2009 | Hunt et al. |
| 2009/0106178 | A1 | 4/2009 | Chu |
| 2010/0049538 | A1 | 2/2010 | Frazer et al. |
| 2011/0145175 | A1 | 6/2011 | Agarwal |
| 2011/0289025 | A1 | 11/2011 | Yan et al. |
| 2011/0313900 | A1 | 12/2011 | Falkenborg et al. |

OTHER PUBLICATIONS

"Predictive Model Markup Language," [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010, 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., http://creativecommons.org., 5 pages.

Creative Commons Attribution-Share Alike 3.0 Unported, Winnow (algorithm)., http://creativecommons.org., 2 pages.

Chandra, et al. "Sibyl: a system for large scale machine learning"., ladisworkshop.org, Published: Sep. 21 2010, 43 pages.

Duchi, John, et al., "Boosting with Structural Sparsity", 2009, cs.berkeley.edu [online] [Retrieved on Jan. 25, 2011]. Retrieved from the Internet: <URL:http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online].[Retrieved on Jan. 25, 2011]. Retrieved from the Internet: <URL:http://www.cs.berkeley.edu/~jduchi/projects/DuchiSi09a.pdf>, 8 pages.

R-Project web pages, 190 pages. [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com>, 16 pages.

Zementis web pages [online] [Retrieved on May 18, 2010]. Retrieved from the Internet: <URL:http://www.zementis.com>, 34 pages.

Weiss, Integrating Real-Time Predictive Analytics into SAP Applications [online], Dec. 30 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 10 pages.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active_learning_(machine learning), 3 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2010]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, vol. 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter'; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.
Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.
T. Dietterich, Ensemble Methods in Machine Learning:, J. Kittler and F. Foli (Eds.), MCS 2000, pp. 1-15.
Predictive Dynamix Inc., Predictive Modeling Technology, Predictive Dynamix, Inc., 2003-2004, 5 pages.
Duin, P.W. Robert, et al., Experiments with Classifier Combining Rules, J. Kittler and F. Foli (Eds.): MCS 2000, LNCS 1857, pp. 16-29, 14 pages.
Barbieri, Maddalena Maria, et al., Optimal Predictive Model Selection, The Annals of Statistics, 2004, vol. 32, No. 3, 29 pages.
Yuan, Zheng et al., Combining Linear Progression Models: When and How? Dec. 2004, 27 pages.
Evaluating Predictive Models, 36-350, Data Mining, Principles of Data Mining, Chapter 7; Berk chapter 2, Oct. 26 and 28, 2001, 22 pages.
Bengio, Yoshua, Continuous Optimization of Hyper-Parameters, C.P. 6128 Succ. Centre-Ville, Montreal, Quebec, Canada, H3C 3J7, Aug. 6, 2002, 7 pages.
Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.
International Search Report and Written Opinion for PCT application serial No. PCT/US2012/022655, mailed Apr. 19, 2012.

\* cited by examiner

UPDATEABLE PREDICTIVE ANALYTICAL MODELING

CROSS-REFERENCE TO RELATED APPLICATIONS

This application is a continuation of, and claims priority under 35 USC §120 to, U.S. patent application Ser. No. 13/014,223, filed on Jan. 26, 2011, which is hereby incorporated by reference in its entirety.

TECHNICAL FIELD

This specification relates to training and retraining predictive models.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In general, in one aspect, the subject matter described in this specification can be embodied in a computer-implemented system that includes one or more computers and one or more data storage devices coupled to the one or more computers. The one or more data storage devices store: a repository of training functions; a predictive model repository that includes a first set of trained predictive models (including multiple updateable trained predictive model) each of which is associated with an effectiveness score that represents an estimation of the effectiveness of the respective trained predictive model; and instructions that, when executed by the one or more computers, cause the one or more computers to perform operations. The operations include receiving over a network a series of training data sets for predictive modeling from a client computing system. The training data included in the training data sets is different from initial training data that was used with multiple training functions obtained from the repository to train the trained predictive models stored in the predictive model repository. The operations further include using the series of training data sets, multiple trained updateable predictive models obtained from the predictive model repository and multiple training functions obtained from the repository of training functions to generate multiple retrained predictive models. An effectiveness score is generated for each of the retrained predictive models. A first trained predictive model is selected from among the multiple trained predictive models included in the predictive model repository and the multiple retrained predictive models based on their respective effectiveness scores. Access is provided to the first trained predictive model over the network. Other embodiments of this aspect include corresponding methods and computer programs recorded on computer storage devices, each configured to perform the operations described above.

These and other embodiments can each optionally include one or more of the following features, alone or in combination. The series of training data sets can be received incrementally or together in a batch. The operations can further include, for each of the retrained predictive model, comparing the effectiveness score of the retrained predictive model to the effectiveness score of the updateable trained predictive model from the predictive model repository that was used to generate the retrained predictive model and, based on the comparison, selecting a first of the two predictive models to store in the repository of predictive models and not storing a second of the two predictive models in the repository.

Using the series of training data sets to generate the retrained predictive models can occur in response to determining: that a request to update the repository of predictive models has been received from the client computing system; that a size of the training data included in the received series of training data sets has reached or exceeded a threshold size; and/or that a predetermined period of time has expired.

The operations can further include generating updated training data that includes a least some of the initial training data and at least some of the training data included in the series of training data sets. A second set of multiple predictive models can be generated using the updated training data and training functions obtained from the repository of training functions. For each of the second set of predictive models, a respective effectiveness score can be generated. A second trained predictive model can be determined based on the effectiveness scores of the second set of predictive models. Access can be provided to the second trained predictive model over the network.

Selecting a second trained predictive model based on the effectiveness scores of the second set of predictive models can include selecting the second trained predictive model from among the second set of predictive models. Selecting a second trained predictive model based on the effectiveness scores of the second set of predictive models can include selecting the second trained predictive model from among the second set of predictive models and the retrained predictive models and can be further based on the effectiveness scores of the retrained predictive models. Selecting a second trained predictive model based on the effectiveness scores of the second set of predictive models can include selecting the second trained predictive model from among the second set of predictive models and the predictive models included in the predictive model repository, and can be further based on the effectiveness scores of the predictive models included in the predictive model repository.

Generating the second set of predictive models can occur in response to: determining that a request to update the repository of predictive models has been received from the client computing system; determining that a size of the updated training data has reached or exceeded a threshold size; and/or determining that a predetermined period of time has expired.

The operations can further include receiving input data, data identifying the first trained predictive model, and a request for a predictive output; and generating the predictive output using the first predictive model and the input data.

Particular embodiments of the subject matter described in this specification can be implemented so as to realize one or more of the following advantages. A dynamic repository of trained predictive models can be maintained that includes updateable trained predictive models. The updateable trained predictive models can be dynamically updated as new training data becomes available. Static trained predictive models (i.e., predictive models that are not updateable) can be regenerated using an updated set of training data. A most effective trained predictive model can be selected from the dynamic repository and used to provide a predictive output in response to receiving input data. The most effective trained predictive model in the dynamic repository can change over time as new training data becomes available and is used to update the repository (i.e., to update and/or regenerate the trained predictive models). A service can be provided, e.g., "in the cloud", where a client computing system can provide input data and a prediction request and receive in response a predictive output without expending client-side computing resources or requiring client-side expertise for predictive analytical modeling. The client computing system can incrementally provide new training data and be provided access to the most effective trained predictive model available at a given time, based on the training data provided by the client computing system as of that given time. An updateable trained predictive model that gives an erroneous predictive output can be easily and quickly corrected, for example, by providing the correct output as an update training sample upon detecting the error in output.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Methods and systems are described that provide a dynamic repository of trained predictive models, at least some of which can be updated as new training data becomes available. A trained predictive model from the dynamic repository can be provided and used to generate a predictive output for a given input. As a particular client entity's training data changes over time, the client entity can be provided access to a trained predictive model that has been trained with training data reflective of the changes. As such, the repository of trained predictive models from which a predictive model can be selected to use to generate a predictive output is "dynamic", as compared to a repository of trained predictive models that are not updateable with new training data and are therefore "static".

Figure 1:
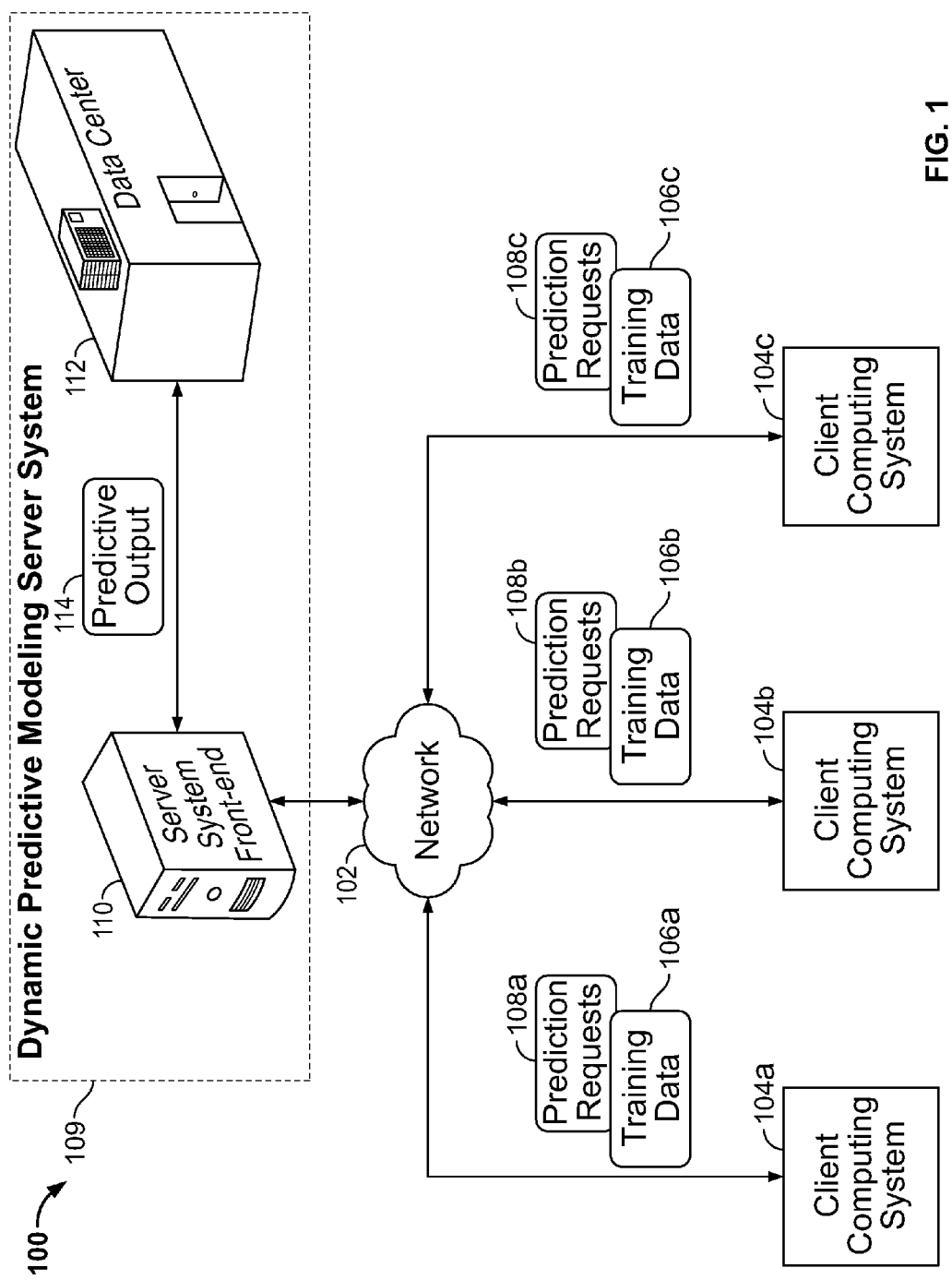
FIG. 1 is a schematic representation of a system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
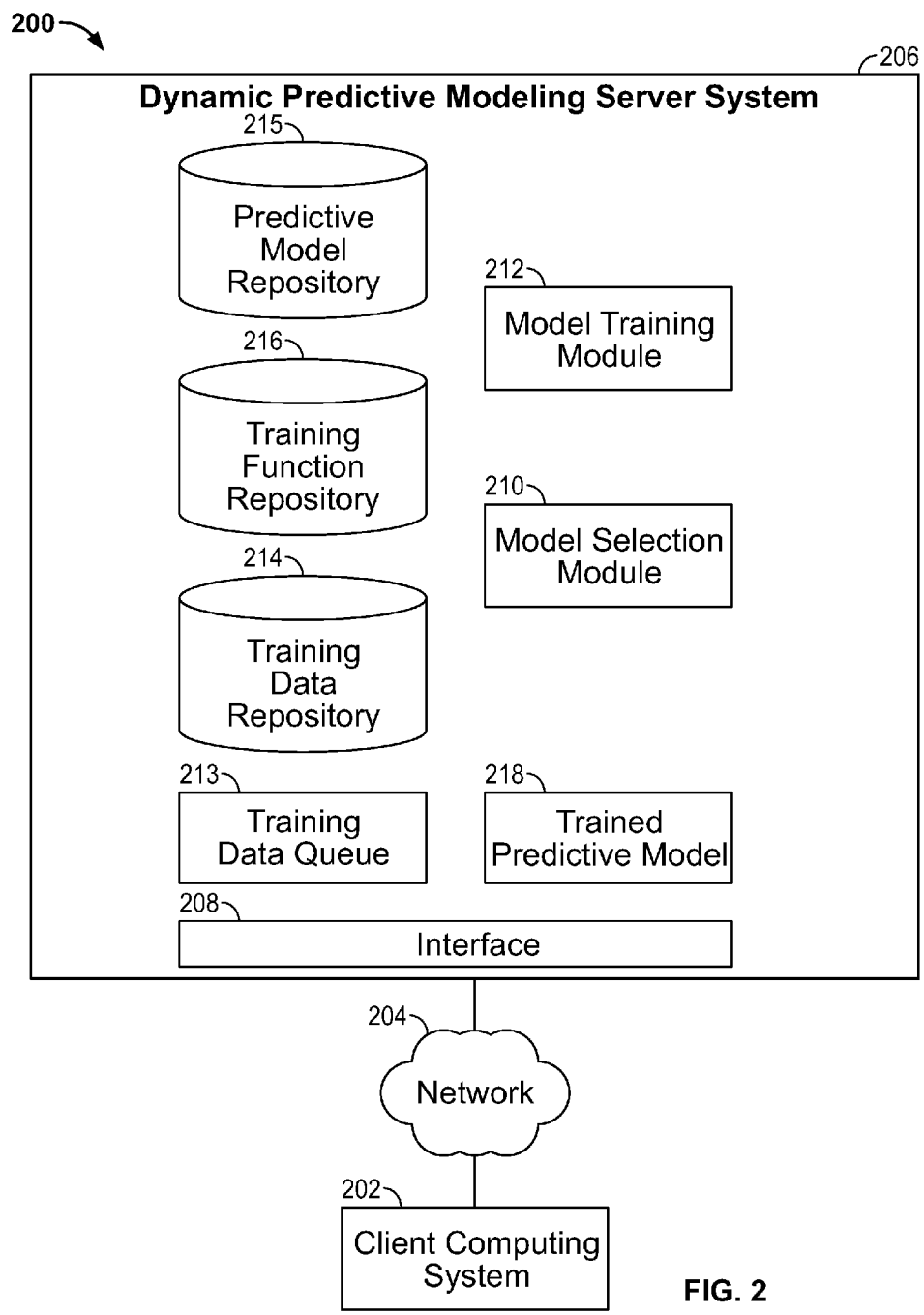
FIG. 2 is a schematic block diagram showing a system for providing a predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the trained model repository 218.

Figure 3:
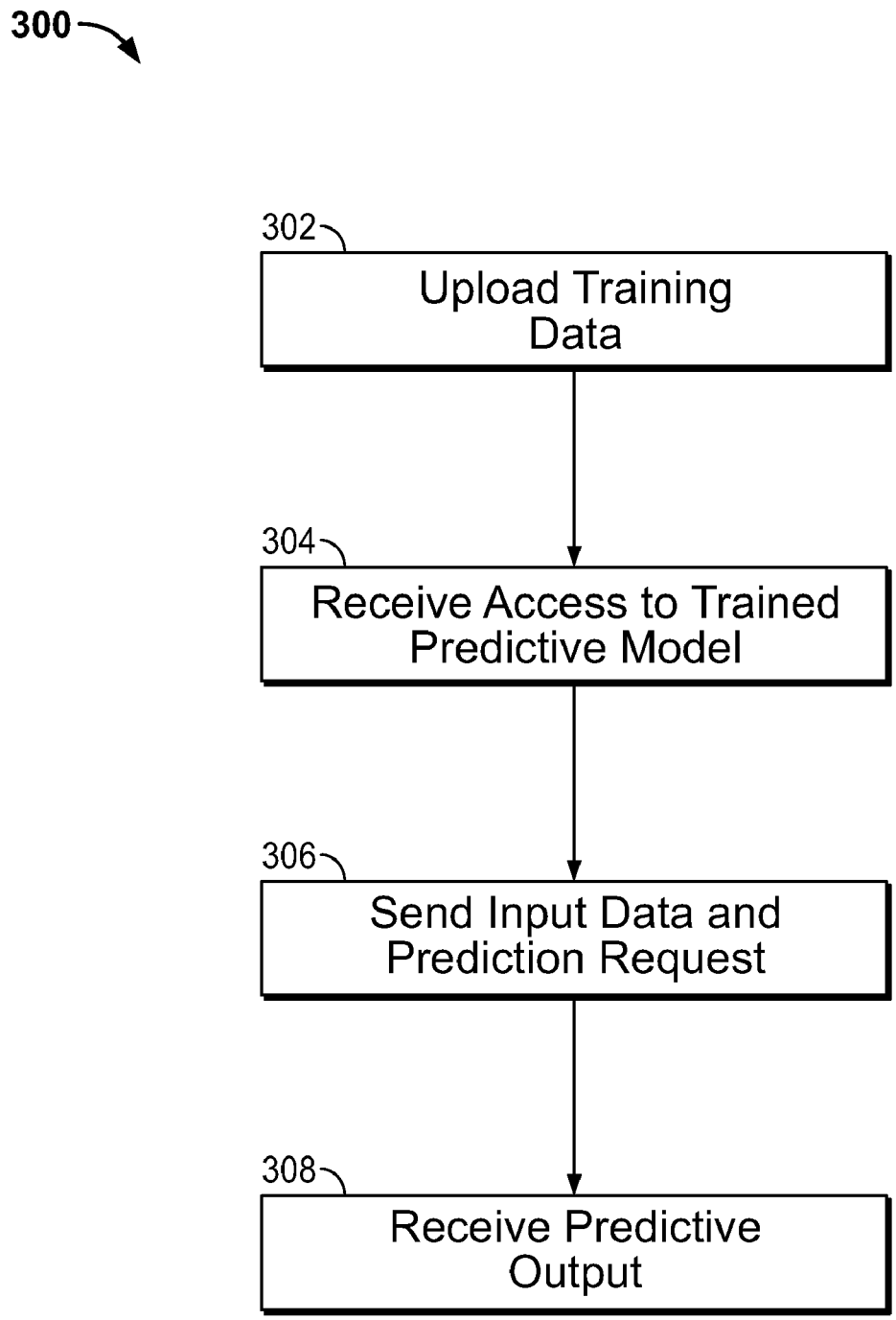
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 would be carried out by the client computing system 202 when the corresponding client entity was uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
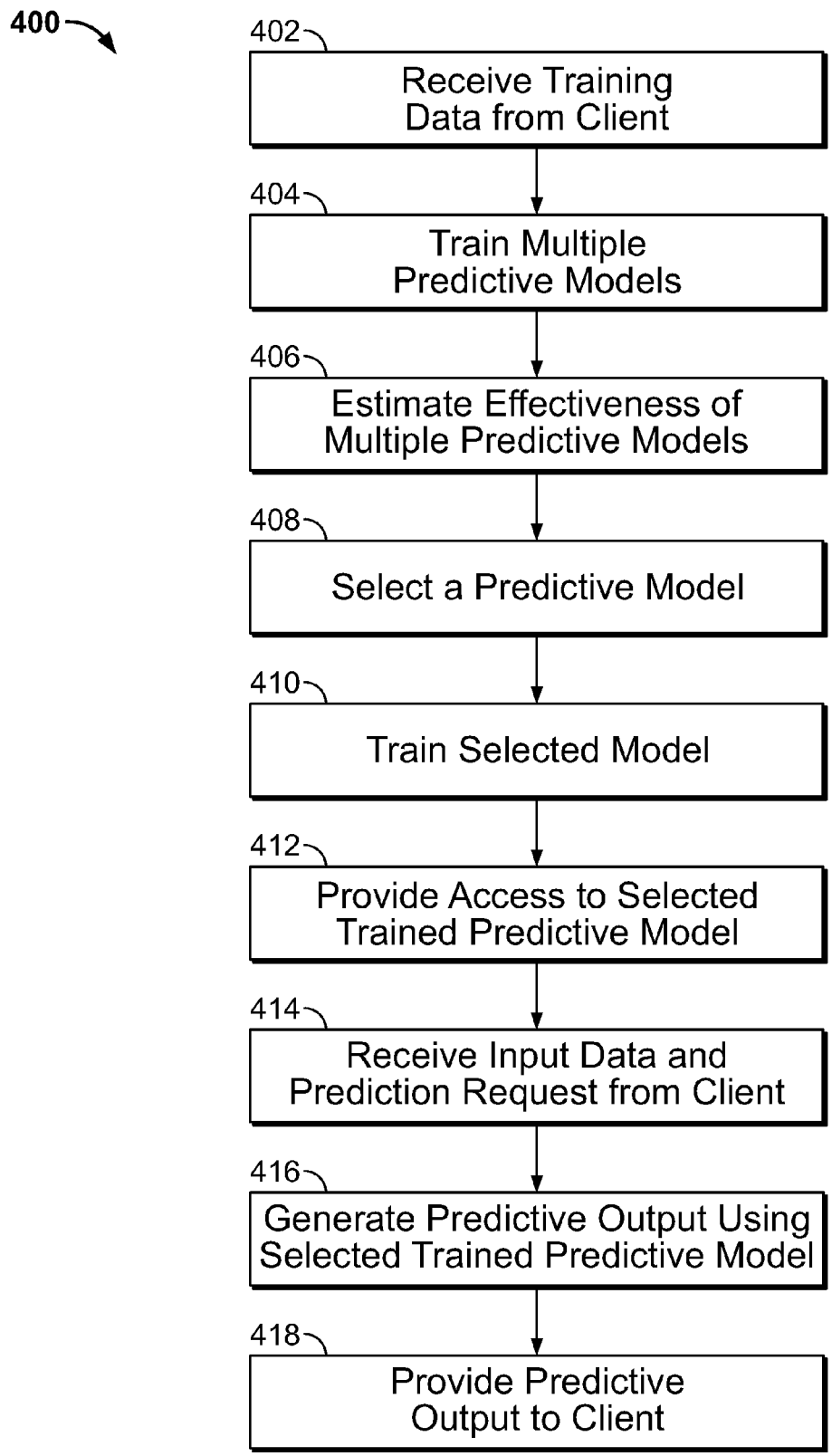
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data. Providing accessing to the client computing system of a predictive model that has been retrained using new training data (i.e., training data available after receiving the initial training data) is described below in reference to FIGS. 5 and 6.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entrophy (MaxEnt) Analogue, Gradient based (FOBOS) and AdaBoost with Mixed Norm Regularization. The training function repository 216 can include one or more of these example training functions.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414). In response, the input data is input to the trained predictive model 218 and a predictive output generated by the trained model (Step 416). The predictive output is provided; it can be provided to the client computing system (Step 418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Figure 5:
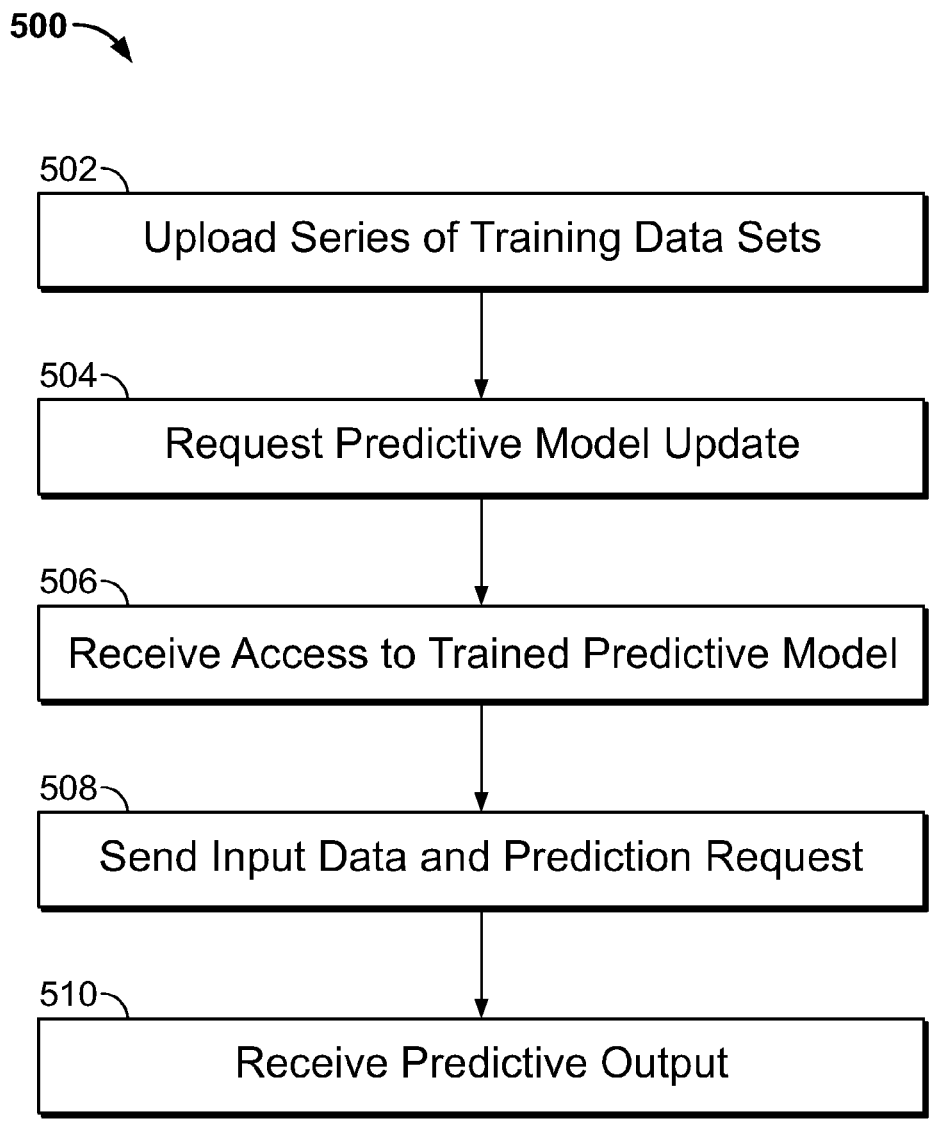
FIG. 5 is a flowchart showing an example process for using the predictive analytic platform from the perspective of the client computing system.

FIG. 5 is a flowchart showing an example process 500 for using the predictive analytic platform from the perspective of the client computing system. For illustrative purposes, the process 500 is described in reference to the predictive modeling server system 206 of FIG. 2, although it should be understood that a differently configured system could perform the process 500. The process 500 would be carried out by the client computing system 202 when the corresponding client entity was uploading the "new" training data to the system 206. That is, after the initial training data had been uploaded by the client computing system and used to train multiple predictive models, at least one of which was then made accessible to the client computing system, additional new training data becomes available. The client computing system 202 uploads the new training data to the predictive modeling server system 206 over the network 204 (Box 502).

In some implementations, the client computing system 202 uploads new training data sets serially. For example, the client computing system 202 may upload a new training data set whenever one becomes available, e.g., on an ad hoc basis. In another example, the client computing system 202 may upload a new training data set according to a particular schedule, e.g., at the end of each day. In some implementations, the client computing system 202 uploads a series of new training data sets batched together into one relatively large batch. For example, the client computing system 202 may upload a new batch of training data sets whenever the batched series of training data sets reach a certain size (e.g., number of megabytes). In another example, the client computing system 202 may upload a new batch of training data sets accordingly to a particular schedule, e.g., once a month.

Table 1 below shows some illustrative examples of commands that can be used by the client computing system 202 to upload a new training data set that includes an individual update, a group update (e.g. multiple examples within an API call), an update from a file and an update from an original file (i.e., a file previously used to upload training data).

TABLE 1

| Type of Update | Command |
|---|---|
| Individual Update | curl -X POST -H . . . -d "{\"data\":{\"input\":{\"mixture\":[0,2]}\"output\":[0]}}" https . . . /bucket%2Ffile.csv/update |
| Individual Update | curl -X POST -H . . . -d "{\"data\":{\"data\":[0,0,2]}} https . . . /bucket%2Ffile.csv/update |
| Group Update | curl -X POST -H . . . -d"{\"data\":{\"input\":{\"mixture\":[[0,2],[1,2] . . . [x,y]]}\"output\":[0, 1 . . . z]}}" https . . . /bucket%2Ffile.csv/update |
| Group Update | curl -X POST -H . . . -d"{\"data\":{\"data\":[[0,0,.2],[1,1,2] . . . [z,x,y]]}} https . . . /bucket%2Ffile.csv/update |
| Update from File | curl -X POST -H . . . -d "bucket%2Fnewfile" https . . . /bucket%2Ffile.csv/update |
| Update from Original File | curl -X POST -H . . . https . . . /bucket%2Ffile.csv/update |

In the above example command, "data" refers to data used in training the models (i.e., training data); "mixture" refers to a combination of text and numeric data, "input" refers to data to be used to update the model (i.e., new training data), "bucket" refers to a location where the models to be updated are stored, "x", "y" and "z" refer to other potential data values for a given feature.

The series of training data sets uploaded by the client computing system 202 can be stored in the training data queue 213 shown in FIG. 2. In some implementations, the training data queue 213 accumulates new training data until an update of the updateable trained predictive models included in the predictive model repository 215 is performed. In other implementations, the training data queue 213 only retains a fixed amount of data or is otherwise limited. In such implementations, once the training data queue 213 is full, an update can be performed automatically, a request can be sent to the client computing system 202 requesting instructions to perform an update, or training data in the queue 213 can be deleted to make room for more new training data. Other events can trigger a retraining, as is discussed further below.

The client computing system 202 can request that their trained predictive models be updated (Box 504). For example, when the client computing system 202 uploads the series of training data sets (either incrementally or in batch or a combination of both), an update request can be included or implied, or the update request can be made independently of uploading new training data.

In some implementations, an update automatically occurs upon a condition being satisfied. For example, receiving new training data in and of itself can satisfy the condition and trigger the update. In another example, receiving an update request from the client computing system 202 can satisfy the condition. Other examples are described further in reference to FIG. 5.

As described above in reference to FIGS. 2 and 4, the predictive model repository 215 includes multiple trained predictive models that were trained using training data uploaded by the client computing system 202. At least some of the trained predictive models included in the repository 215 are updateable predictive models. When an update of the updateable predictive models occurs, retrained predictive models are generated using the data in the training data queue 213, the updateable predictive models and the corresponding training functions that were used to train the updateable predictive models. Each retrained predictive model represents an update to the predictive model that was used to generate the retrained predictive model.

Each retrained predictive model that is generated using the new training data from the training data queue 213 can be scored to estimate the effectiveness of the model. That is, an effectiveness score can be generated, for example, in the manner described above. In some implementations, the effective score of a retrained predictive model is determined by tallying the results from the initial cross-validation (i.e., done for the updateable predictive model from which the retrained predictive was generated) and adding in the retrained predictive model's score on each new piece of training data. By way of illustrative example, consider Model A that was trained with a batch of 100 training samples and has an estimated 67% accuracy as determined from cross-validation. Model A then is updated (i.e., retrained) with 10 new training samples, and the retrained Model A gets 5 predictive outputs correct and 5 predictive outputs incorrect. The retrained Model A's accuracy can be calculated as (67+5)/(100÷10)=65%.

In some implementations, the effectiveness score of the retrained predictive model is compared to the effectiveness score of the trained predictive model from which the retrained predictive model was derived. If the retrained predictive model is more effective, then the retrained predictive model can replace the initially trained predictive model in the predictive model repository 215. If the retrained predictive model is less effective, then it can be discarded. In other implementations, both predictive models are stored in the repository, which therefore grows in size. In other implementations, the number of predictive models stored in the repository 215 is fixed, e.g., to n models where n is an integer, and only the trained predictive models with the top n effectiveness scores are stored in the repository. Other techniques can be used to decide which trained predictive models to store in the repository 215.

If the predictive model repository 215 included one or more static predictive models, that is, trained predictive models that are not updateable with incremental new training data, then those models are not updated during this update phase (i.e., update phase where an update of only the updateable predictive models is occurring). From the trained predictive models available to the client computing system 202, including the "new" retrained predictive models and the "old" static trained predictive models, a trained predictive model can be selected to provide to the client computing system 202. For example, the effectiveness scores of the available trained predictive models can be compared, and the most effective trained predictive model selected. The client computing system 202 can receive access to the selected trained predictive model (Box 506).

In some instances, the selected trained predictive model is the same trained predictive model that was selected and provided to the client computing system 202 after the trained predictive models in the repository 215 were trained with the initial training data or a previous batch of training data from the training data queue. That is, the most effective trained predictive model from those available may remain the same even after an update. In other instances, a different trained predictive model is selected as being the most effective. Changing the trained predictive model that is accessible by the client computing system 202 can be invisible to the client computing system 202. That is, from the perspective of the client computing system 202, input data and a prediction request is provided to the accessible trained predictive model (Box 508). In response, a predictive output is received by the client computing system 202 (Box 510). The selected trained predictive model is used to generate the predictive output based on the received input. However, if the particular trained predictive model being used system-side changes, this can make no difference from the perspective of the client computing system 202, other than, a more effective model is being used and therefore the predictive output should be correspondingly more accurate as a prediction.

From the perspective of the client computing system 202, updating the updateable trained predictive models is relatively simple. The updating can be all done remote from the client computing system 202 without expending client computing system resources. In addition to updating the updateable predictive models, the static predictive models can be "updated". The static predictive models are not actually "updated", but rather new static predictive models can be generated using training data that includes new training data. Updating the static predictive models is described in further detail below in reference to FIG. 7.

Figure 6:
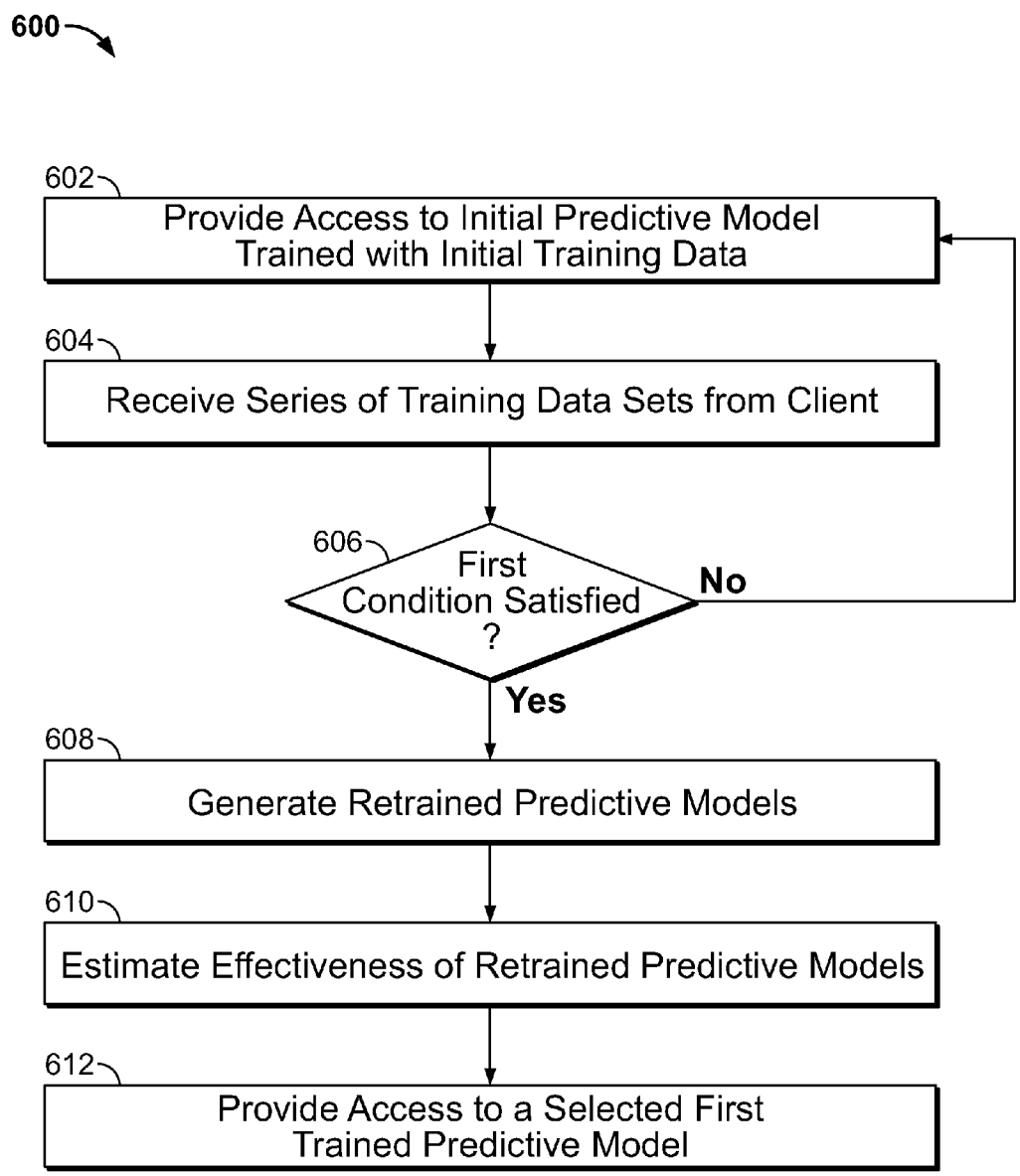
FIG. 6 is a flowchart showing an example process for retraining updateable trained predictive models using the predictive analytic platform.

FIG. 6 is a flowchart showing an example process 600 for retraining updateable trained predictive models using the predictive analytic platform. For illustrative purposes, the process 600 is described in reference to the predictive modeling server system 206 of FIG. 2, although it should be understood that a differently configured system could perform the process 600. The process 600 begins with providing access to an initial trained predictive model (e.g., trained predictive model 218) that was trained with initial training data (Box 602). That is, for example, operations such as those described above in reference to boxes 402-412 of FIG. 4 can have already occurred such that a trained predictive model has been selected (e.g., based on effectiveness) and access to the trained predictive model has been provided, e.g., to the client computing system 202.

A series of training data sets are received from the client computing system 202 (Box 604). For example, as described above, the series of training data sets can be received incrementally or can be received together as a batch. The series of training data sets can be stored in the training data queue 213. When a first condition is satisfied ("yes" branch of box 606), then an update of updateable trained predictive models stored in the predictive model repository 215 occurs. Until the first condition is satisfied ("no" branch of box 606), access can continue to be provided to the initial trained predictive model (i.e., box 602) and new training data can continue to be received and added to the training data queue 213 (i.e., box 604).

The first condition that can trigger can update of updateable trained predictive models can be selected to accommodate various considerations. Some example first conditions were already described above in reference to FIG. 5. That is, receiving new training data in and of itself can satisfy the first condition and trigger the update. Receiving an update request from the client computing system 202 can satisfy the first condition. Other examples of first condition include a threshold size of the training data queue 213. That is, once the volume of data in the training data queue 213 reaches a threshold size, the first condition can be satisfied and an update can occur. The threshold size can be defined as a predetermined value, e.g., a certain number of kilobytes of data, or can be defined as a fraction of the training data included in the training data repository 214. That is, once the amount of data in the training data queue is equal to or exceeds x % of the data used to initially train the trained predictive model 218 or x % of the data in the training data repository 214 (which may be the same, but could be different), the threshold size is reached. In another example, once a predetermine time period has expired, the first condition is satisfied. For example, an update can be scheduled to occur once a day, once a week or otherwise. In another example, if the training data is categorized, then when the training data in a particular category included in the new training data reaches a fraction of the initial training data in the particular category, then the first condition can be satisfied. In another example, if the training data can be identified by feature, then when the training data with a particular feature reaches a fraction of the initial training data having the particular feature, the first condition can be satisfied (e.g., widgets X with scarce property Y). In yet another example, if the training data can be identified by regression region, then when the training data within a particular regression region reaches a fraction of the initial training data in the particular regression region (e.g., 10% more in the 0.0 to 0.1 predicted range), then the first condition can be satisfied. The above are illustrative examples, and other first conditions can be used to trigger an update of the updateable trained predictive models stored in the predictive model repository 215.

The updateable trained predictive models that are stored in the repository 215 are "updated" with the training data stored in the training data queue 213. That is, retrained predictive models are generated (Box 608) using: the training data queue 213; the updateable trained predictive models obtained from the repository 215; and the corresponding training functions that were initially used to train the updateable trained predictive models, which training functions are obtained from the training function repository 216.

The effectiveness of each of the generated retrained predictive models is estimated (Box 610). The effectiveness can be estimated, for example, in the manner described above in reference to FIG. 5 and an effectiveness score for each retrained predictive model can be generated.

A trained predictive model is selected from the multiple trained predictive models based on their respective effectiveness scores. That is, the effectiveness scores of the retrained predictive models and the effectiveness scores of the trained predictive models already stored in the repository 215 can be compared and the most effective model, i.e., a first trained predictive model, selected. Access is provided to the first trained predictive model to the client computing system 202 (Box 612). As was discussed above, in some implementations, the effectiveness of each retrained predictive model can be compared to the effectiveness of the updateable trained predictive model from which it was derived, and the most effective of the two models stored in the repository 215 and the other discarded. In some implementations, this step can occur first and then the effectiveness scores of all of the models stored in the repository 215 can be compared and the first trained predictive model selected. As was also discussed above, the first trained predictive model may end up being the same model as the initial trained predictive model that was provided to the client computing system 202 in Box 602. That is, even after the update, the initial trained predictive model may still be the most effective model. In other instances, a different trained predictive model may end up being the most effective, and therefore the trained predictive model to which the client computing system 202 has access changes after the update.

Of the multiple retrained predictive models that were trained as described above, some or all of them can be stored in the predictive model repository 215. In some implementations, the predictive models stored in the repository 215 are trained using the entire new training data, i.e., all K partitions and not just K−1 partitions. In other implementations, the trained predictive models that were generated in an evaluation phase using K−1 partitions are stored in the repository 215, so as to avoid expending additional resources to recomputed the trained predictive models using all K partitions.

In the implementations described above, the first trained predictive model is hosted by the dynamic predictive modeling server system 206 and can reside and execute on a computer at a location remote from the client computing system 202. However, as described above in reference to FIG. 4, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the first trained predictive model 218 is provided to a client computing system 202 or elsewhere, and can be used locally by the client entity.

Figure 7:
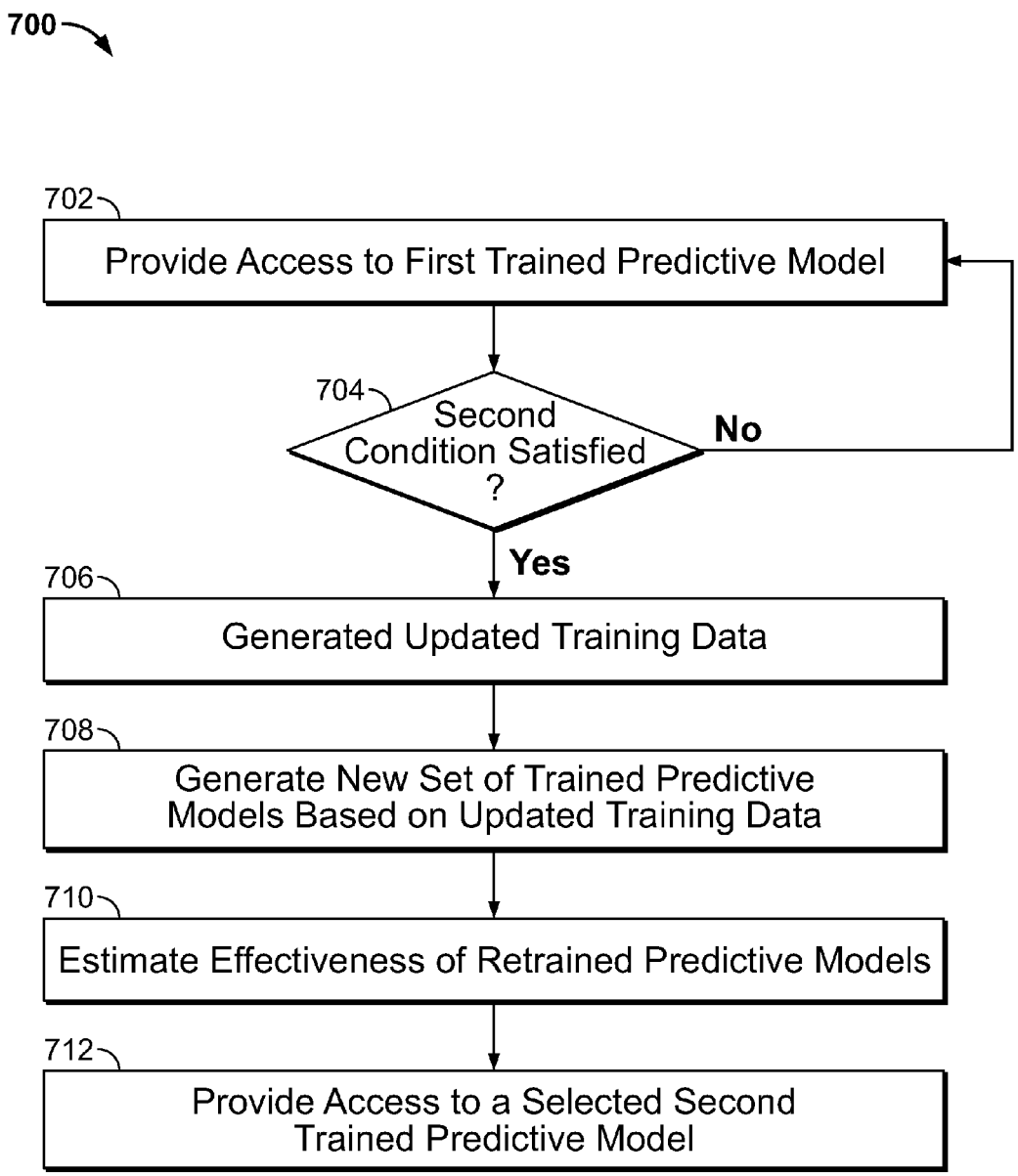
FIG. 7 is a flowchart showing an example process for generating a new set of trained predictive models using updated training data.

FIG. 7 is a flowchart showing an example process 700 for generating a new set of trained predictive models using updated training data. For illustrative purposes, the process 700 is described in reference to the predictive modeling server system 206 of FIG. 2, although it should be understood that a differently configured system could perform the process 700. The process 700 begins with providing access to a first trained predictive model (e.g., trained predictive model 218) (Box 702). That is, for example, operations such as those described above in reference to boxes 602-612 of FIG. 6 can have already occurred such that the first trained predictive model has been selected (e.g., based on effectiveness) and access to the first trained predictive model has been provided, e.g., to the client computing system 202. In another example, the first trained predictive model can be a trained predictive model that was trained using the initial training data. That is, for example, operations such as those described above in reference to boxes 402-412 of FIG. 4 can have already occurred such that a trained predictive model has been selected (i.e., the first trained predictive model) and access to the first trained predictive model has been provided. Typically, the process 700 occurs after some updating of the updateable trained predictive models has already occurred (i.e., after process 600), although that is not necessarily the case.

Referring again to FIG. 7, when a second condition is satisfied ("yes" branch of box 704), then an "update" of some or all the trained predictive models stored in the predictive model repository 215 occurs, including the static trained predictive models. This phase of updating is more accurately described as a phase of "regeneration" rather than updating. That is, the trained predictive models from the repository 215 are not actually updated, but rather a new set of trained predictive models are generated using different training data then was used to initially train the models in the repository (i.e., the different than the initial training data in this example).

Updated training data is generated (Box 706) that will be used to generate the new set of trained predictive models. In some implementations, the training data stored in the training data queue 213 is added to the training data that is stored in the training data repository 214. The merged set of training data can be the updated training data. Such a technique can work well if there are no constraints on the amount of data that can be stored in the training data repository 214. However, in some instances there are such constraints, and a data retention policy can be implemented to determine which training data to retain and which to delete for purposes of storing training data in the repository 214 and generating the updated training data. The data retention policy can define rules governing maintaining and deleting data. For example, the policy can specify a maximum volume of training data to maintain in the training data repository, such that if adding training data from the training data queue 213 will cause the maximum volume to be exceeded, then some of the training data is deleted. The particular training data that is to be deleted can be selected based on the date of receipt (e.g., the oldest data is deleted first), selected randomly, selected sequentially if the training data is ordered in some fashion, based on a property of the training data itself, or otherwise selected.

A particular illustrative example of selecting the training data to delete based on a property of the training data can be described in terms of a trained predictive model that is a classifier and the training data is multiple feature vectors. An analysis can be performed to determine ease of classification of each feature vector in the training data using the classifier. A set of feature vectors can be deleted that includes a larger proportion of "easily" classified feature vectors. That is, based on an estimation of how hard the classification is, the feature vectors included in the stored training data can be pruned to satisfy either a threshold volume of data or another constraint used to control what is retained in the training data repository 214.

For illustrative purposes, in one example the updated training data can be generated by combining the training data in the training data queue together with the training data already stored in the training data repository 216 (e.g., the initial training data). In some implementations, the updated training data can then be stored in the training data repository 214 and can replace the training data that was previously stored (to the extent that the updated training data is different). In some implementations, the training data queue 213 can be cleared to make space to new training data to be received in the future.

A new set of trained predictive models is generated using the updated training data and using training functions that are obtained from the training function repository 216 (Box 708). The new set of trained predictive models includes at least some updateable trained predictive models and can include at least some static trained predictive models.

The effectiveness of each trained predictive model in the new set can be estimated, for example, using techniques described above (Step 710). In some implementations, an effectiveness score is generated for each of the new trained predictive models.

A second trained predictive model can be selected to which access is provided to the client computing system 202 (Box 712). In some implementations, the effectiveness scores of the new trained predictive models and the trained predictive models stored in the repository 215 before this updating phase began are all compared and the most effective trained predictive model is selected as the second trained predictive model. In some implementations, the trained predictive models that were stored in the repository 215 before this updating phase began are discarded and replaced with the new set of trained predictive models, and the second trained predictive model is selected from the trained predictive models currently stored in the repository 215. In some implementations, the static trained predictive models that were stored in the repository 215 before the updating phase began are replaced by their counterpart new static trained predictive models. The updateable trained predictive models that were stored in the repository 215 before the updating phase are either replaced by their counterpart new trained predictive model or maintained, depending on which of the two is more effective. The second trained predictive model then can be selected from among the trained predictive models stored in the repository 215.

In some implementations, only a predetermined number of predictive models are stored in the repository 215, e.g., n (where n is an integer greater than 1), and the trained predictive models with the top n effectiveness scores are selected from among the total available predictive models, i.e., from among the new set of trained predictive models and the trained predictive models that were stored in the repository 215 before the updating phase began. Other techniques can be used to determine which trained predictive models to store in the repository 215 and which pool of trained predictive models is used from which to select the second trained predictive model.

Referring again to Box 704, until the second condition is satisfied which triggers the update of all models included in the repository 215 with updated training data ("No" branch of box 704), the client computing system 202 can continue to be provided access to the first trained predictive model.

Figure 8:
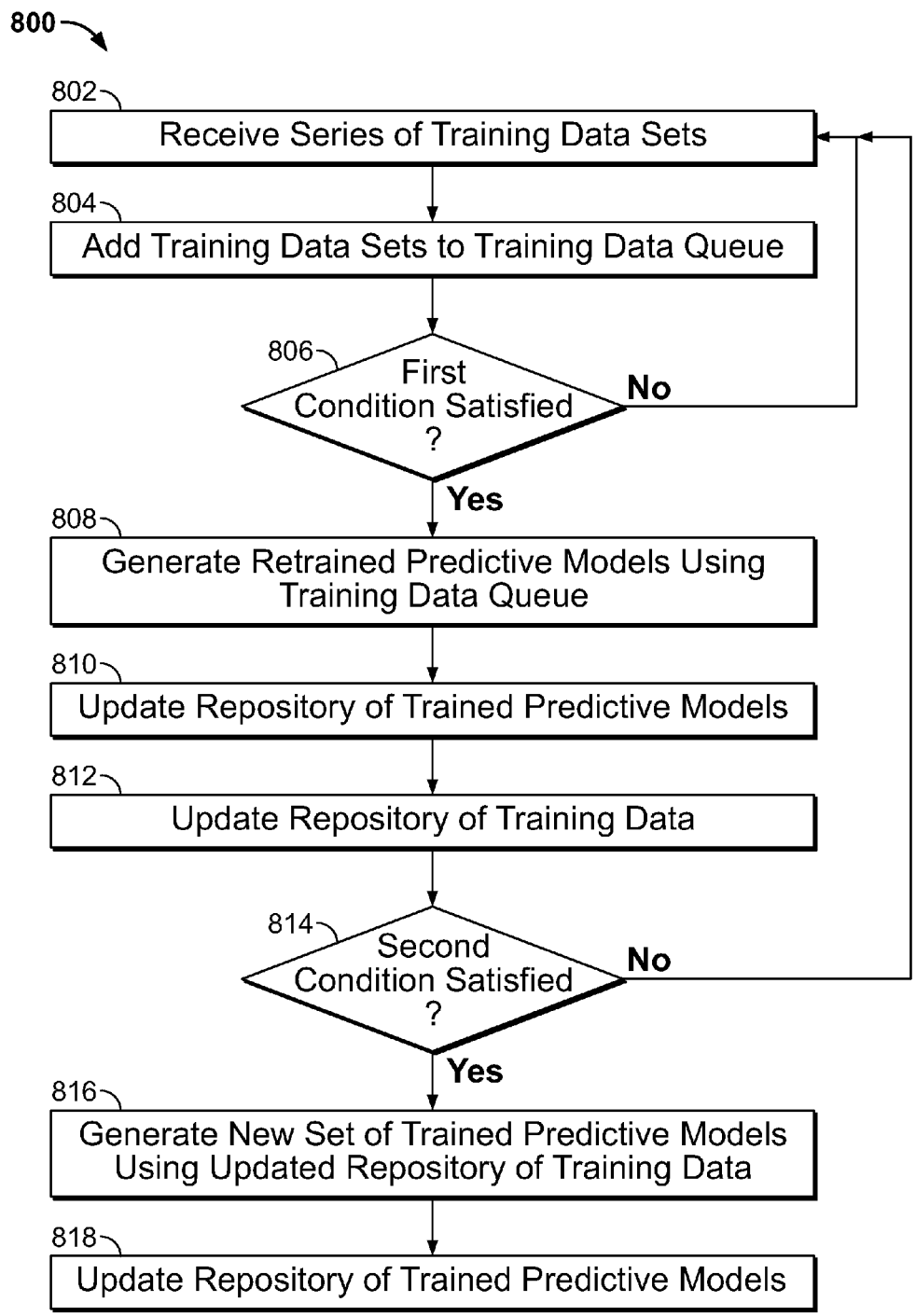
FIG. 8 is a flowchart showing an example process for maintaining an updated dynamic repository of trained predictive models.

FIG. 8 is a flowchart showing an example process 800 for maintaining an updated dynamic repository of trained predictive models. The repository of trained predictive models is dynamic in that new training data can be received and used to update the trained predictive models included in the repository by retraining the updateable trained predictive models and regenerating the static and updateable trained predictive models with updated training data. The dynamic repository can be maintained at a location remote from a computing system that will use one or more of the trained predictive models to generate predictive output. By way of illustrative and non-limiting example, the dynamic repository can be maintained by the predictive modeling server system 206 shown in FIG. 2 for the client computing system 202. In other implementations, the computing system can maintain the dynamic repository locally. For the purpose of describing the process 800, reference shall be made to the system shown in FIG. 2, although it should be understood that a different configured system can be used to perform the process (e.g., if the computing system is maintaining the dynamic repository locally).

When this process 800 begins, a set of trained predictive models exists that includes one or more updateable trained predictive models and one or more static trained predictive models that were previously generated from a set of training data stored in the training data repository 214 and a set of training functions stored in the training function repository 216. The set of trained predictive models is stored in the predictive model repository 215. A series of new training data sets are received (Box 702). The sets of training data can be received incrementally (i.e., serially) or together in one or more batches. The training data sets are added to the training data queue 213. New training data can continue to accumulate in the training data queue 213 as new training data sets are received. The training data sets are "new" in that they are new as compared to the training data in the training data repository 214 that was used to train the set of trained predictive models in the predictive model repository 215.

When a first condition is satisfied ("yes" branch of box 806), then an update of updateable trained predictive models stored in the predictive model repository 215 occurs. The first condition that can trigger can update of updateable trained predictive models can be selected to accommodate various considerations. Some example first conditions were already described above in reference to FIG. 6, although other conditions can be used as the first condition. Until the first condition is satisfied ("no" branch of box 806), training data sets can be continued to be received and added to the training data queue 213.

When the first condition is satisfied, an update of the updateable trained predictive models stored in the repository 215 is triggered. The updateable trained predictive models that are stored in the repository 215 are "updated" with the training data stored in the training data queue 213. That is, retrained predictive models are generated (Box 808) using: the training data queue 213; the updateable trained predictive models obtained from the repository 215; and the corresponding training functions that were previously used to train the updateable trained predictive models, which training functions are obtained from the training function repository 216.

The predictive model repository 215 is updated (Box 810). In some implementations, the predictive model repository 215 is updated by adding the retrained predictive models to the trained predictive models already stored in the repository 215, thereby increasing the total number of trained predictive models in the repository 215. In other implementations, each of the trained predictive models in the repository 215 is associated with an effectiveness score and the effectiveness scores of the retrained predictive models are generated. The effectiveness score of each retrained predictive model can be compared to the effectiveness score of the updateable trained predictive model from which it was derived, and the most effective of the two models stored in the repository 215 and the other discarded, thereby maintaining the same total number of trained predictive models in the repository 215. In other implementations, where there is a desire to maintain only n trained predictive models in the repository (where n is an integer greater than 1), the effectiveness scores of the retrained predictive models and the trained predictive models already stored in the repository 215 can be compared and the n most effective trained predictive models stored in the repository 215 and the others discarded. Other techniques can be used to determine which trained predictive models to store in the repository 215 after the updateable trained predictive models have been retrained.

The training data repository 214 is updated (Box 812). In some implementations, the training data stored in the training data queue 213 is added to the training data that is stored in the training data repository 214. The merged set of training data can be the updated training data. In other implementations, a data retention policy can be implemented to determine which training data to retain and which to delete for purposes of updating the training data repository 214. As was described above in reference to FIG. 7, a data retention policy can define rules governing maintaining and deleting data. For example, the policy can specify a maximum volume of training data to maintain in the training data repository, such that if adding training data from the training data queue 213 will cause the maximum volume to be exceeded, then some of the training data is deleted. The particular training data that is to be deleted can be selected based on the date of receipt (e.g., the oldest data is deleted first), selected randomly, selected sequentially if the training data is ordered in some fashion, based on a property of the training data itself, or otherwise selected. Other techniques can be used to determine which training data from the received series of training data sets is stored in the training data repository 214 and which training data already in the repository 214 is retained.

When a second condition is satisfied ("yes" branch of box 814), then an "update" of all the trained predictive models stored in the predictive model repository 215 occurs, including both the static trained predictive models and the updateable trained predictive models. This phase of updating is more accurately described as a phase of "regeneration" rather than updating. That is, the trained predictive models from the repository 215 are not actually updated, but rather a new set of trained predictive models are generated using different training data then was previously used to train the models in the repository 215. The new set of trained predictive models are generated using the updated training data repository 214 and multiple training functions obtained from the training function repository 216 (Box 816). The updated training data repository 214 can include some (or all) of the same training data that was previously used to train the existing set of models in the repository in addition to some (or all) of the received series of training data sets that were received since the last occurrence of the second condition being satisfied.

The predictive model repository is updated (Box 818). In some implementations, the trained predictive models that were stored in the repository 215 before the second condition was satisfied (i.e., before this updating phase began) are discarded and replaced with the new set of trained predictive models. In some implementations, the static trained predictive models that were stored in the repository 215 before the updating phase began are replaced by their counterpart new static trained predictive models. However, the updateable trained predictive models that were stored in the repository 215 before the updating phase are either replaced by their counterpart new trained predictive model or maintained, depending on which of the two is more effective (e.g., based on a comparison of effectiveness scores). In some implementations, only a predetermined number of predictive models are stored in the repository 215, e.g., n (where n is an integer greater than 1), and the trained predictive models with the top n effectiveness scores are selected from among the total available predictive models, i.e., from among the new set of trained predictive models and the trained predictive models that were stored in the repository 215 before the updating phase began. In some implementations, only trained predictive models with an effectiveness score exceeding a predetermined threshold score are stored in the repository 215 and all others are discarded. Other techniques can be used to determine which trained predictive models to store in the repository 215.

Although the process 800 was described in terms of the first condition being satisfied first to trigger an update of only the updateable trained predictive models followed by the second condition being satisfied to trigger an update of all of the trained predictive models, it should be understood that the steps of process 800 do not require the particular order shown. That is, determinations as to whether first condition is satisfied and whether the second condition is satisfied can occur in parallel. In some instances, the second condition can be satisfied to trigger an update of all of the trained predictive models before the first condition has been satisfied. By way of illustrative example, the first condition may require that a threshold volume of new training data accumulate in the training data queue 213. The second condition may require that a certain predetermined period of time has expired. The period of time could expire before the threshold volume of new training data has been received. Accordingly, all of the trained predictive models in the repository 215 may be updated using updated training data, before the updateable trained predictive models were updated with the incremental new training data. Other scenarios are possible, and the above is but one illustrative example.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented system comprising:
   one or more computers;
   one or more data storage devices coupled to the one or more computers, storing:
      a repository of training functions,
      a predictive model repository of trained predictive models, including a plurality of updateable trained predictive models, and wherein each trained predictive model is associated with an effectiveness score that represents an estimation of the effectiveness of the respective trained predictive model, and
      instructions that, when executed by the one or more computers, cause the one or more computers to perform operations comprising:
         receiving over a network a series of training data sets for predictive modeling from a client computing system, wherein training data included in the training data sets is different from initial training data that was used with a plurality of training functions obtained from the repository to train the trained predictive models stored in the predictive model repository;
         using the series of training data sets, a plurality of trained updateable predictive models obtained from the predictive model repository and a plurality of training functions obtained from the repository of training functions to generate a plurality of retrained predictive models;
         generating an effectiveness score for each of the plurality of retrained predictive models;
         selecting a first trained predictive model from among the plurality of trained predictive models included in the predictive model repository and the plurality of retrained predictive models based on their respective effectiveness scores; and
         providing access to the first trained predictive model over the network.

2. The system of claim 1, wherein the series of training data sets are received incrementally.

3. The system of claim 1, wherein the series of training data sets are received together in a batch.

4. The system of claim 1, wherein the operations further comprise:
   for each of the plurality of retrained predictive models:
      comparing the effectiveness score of the retrained predictive model to the effectiveness score of the updateable trained predictive model from the predictive model repository that was used to generate the retrained predictive model; and
      based on the comparison, selecting a first of the two predictive models to store in the repository of predictive models and not storing a second of the two predictive models in the repository.

5. The system of claim 1, wherein using the series of training data sets to generate the plurality of retrained predictive models occurs in response to determining that a request to update the repository of predictive models has been received from the client computing system.

6. The system of claim 1, wherein using the series of training data sets to generate the plurality of retrained predictive models occurs in response to determining that a size of the training data included in the received series of training data sets has reached or exceeded a threshold size.

7. The system of claim 1, wherein using the series of training data sets to generate the plurality of retrained predictive models occurs in response to determining that a predetermined period of time has expired.

8. The system of claim 1, wherein the operations further comprise:
   generating updated training data that includes a least some of the initial training data and at least some of the training data included in the series of training data sets;
   generating a second plurality of predictive models using the updated training data and a plurality of training functions obtained from the repository of training functions;
   for each of the second plurality of predictive models, generating a respective effectiveness score;
   selecting a second trained predictive model based on the effectiveness scores of the second plurality of predictive models; and
   providing access to the second trained predictive model over the network.

9. The system of claim 8, wherein selecting a second trained predictive model based on the effectiveness scores of the second plurality of predictive models comprises selecting a second trained predictive model from among the second plurality of predictive models.

10. The system of claim 8, wherein selecting a second trained predictive model based on the effectiveness scores of the second plurality of predictive models comprises selecting a second trained predictive model from among the second plurality of predictive models and the plurality of retrained predictive models and is further based on the effectiveness scores of the retrained predictive models.

11. The system of claim 8, wherein selecting a second trained predictive model based on the effectiveness scores of the second plurality of predictive models comprises selecting a second trained predictive model from among the second plurality of predictive models and the predictive models included in the predictive model repository and is further based on the effectiveness scores of the predictive models included in the predictive model repository.

12. The system of claim 8, wherein generating the second plurality of predictive models occurs in response to determining that a request to update the repository of predictive models has been received from the client computing system.

13. The system of claim 8, wherein generating the second plurality of predictive models occurs in response to determining that a size of the updated training data has reached or exceeded a threshold size.

14. The system of claim 8, wherein generating the second plurality of predictive models occurs in response to determining that a predetermined period of time has expired.

15. The system of claim 1, where the operations further comprise:
- receiving input data, data identifying the first trained predictive model, and a request for a predictive output; and
- generating the predictive output using the first predictive model and the input data.

16. A computer-implemented method comprising:
- receiving over a network a series of training data sets for predictive modeling from a client computing system, wherein training data included in the training data sets is different from initial training data that was used with a plurality of training functions obtained from a repository of training functions to train a plurality of trained predictive models stored in a predictive model repository;
- using the series of training data sets, a plurality of trained updateable predictive models obtained from the predictive model repository and a plurality of training functions obtained from the repository of training functions to generate a plurality of retrained predictive models;
- generating an effectiveness score for each of the plurality of retrained predictive models;
- selecting a first trained predictive model from among the plurality of trained predictive models included in the predictive model repository and the plurality of retrained predictive models based on their respective effectiveness scores; and
- providing access to the first trained predictive model over the network.

17. The method of claim 16, wherein using the series of training data sets to generate the plurality of retrained predictive models occurs in response to determining that a size of the training data included in the received series of training data sets has reached or exceeded a threshold size.

18. The method of claim 16, further comprising:
- generating updated training data that includes a least some of the initial training data and at least some of the training data included in the series of training data sets;
- generating a second plurality of predictive models using the updated training data and a plurality of training functions obtained from the repository of training functions;
- for each of the second plurality of predictive models, generating a respective effectiveness score;
- selecting a second trained predictive model based on the effectiveness scores of the second plurality of predictive models; and
- providing access to the second trained predictive model over the network.

19. The method of claim 18, wherein generating the second plurality of predictive models occurs in response to determining that a predetermined period of time has expired.

20. The method of claim 16, further comprising:
- receiving input data, data identifying the first trained predictive model, and a request for a predictive output; and
- generating the predictive output using the first predictive model and the input data.

21. A computer-readable storage device encoded with a computer program product, the computer program product comprising instructions that when executed on one or more computers cause the one or more computers to perform operations implementing an adaptable predictive model training system, the operations comprising:
- receiving over a network a series of training data sets for predictive modeling from a client computing system, wherein training data included in the training data sets is different from initial training data that was used with a plurality of training functions obtained from a repository of training functions to train a plurality of trained predictive models stored in a predictive model repository;
- using the series of training data sets, a plurality of trained updateable predictive models obtained from the predictive model repository and a plurality of training functions obtained from the repository of training functions to generate a plurality of retrained predictive models;
- generating an effectiveness score for each of the plurality of retrained predictive models;
- selecting a first trained predictive model from among the plurality of trained predictive models included in the predictive model repository and the plurality of retrained predictive models based on their respective effectiveness scores; and
- providing access to the first trained predictive model over the network.

22. The computer-readable storage device of claim 21, wherein using the series of training data sets to generate the plurality of retrained predictive models occurs in response to determining that a size of the training data included in the received series of training data sets has reached or exceeded a threshold size.

23. The computer-readable storage device of claim 21, the operations further comprising:
- generating updated training data that includes a least some of the initial training data and at least some of the training data included in the series of training data sets;
- generating a second plurality of predictive models using the updated training data and a plurality of training functions obtained from the repository of training functions;
- for each of the second plurality of predictive models, generating a respective effectiveness score;
- selecting a second trained predictive model based on the effectiveness scores of the second plurality of predictive models; and
- providing access to the second trained predictive model over the network.

24. The computer-readable storage device of claim 23, wherein generating the second plurality of predictive models occurs in response to determining that a predetermined period of time has expired.

25. The computer-readable storage device of claim 21, the operations further comprising:
- receiving input data, data identifying the first trained predictive model, and a request for a predictive output; and
- generating the predictive output using the first predictive model and the input data.

* * * * *